US006987874B2

(12) United States Patent
Hirose et al.

(10) Patent No.: US 6,987,874 B2
(45) Date of Patent: Jan. 17, 2006

(54) METHOD AND APPARATUS FOR MANAGING SURFACE IMAGE OF THIN FILM DEVICE, AND METHOD AND APPARATUS FOR MANUFACTURING THIN FILM DEVICE USING THE SAME

(75) Inventors: Takenori Hirose, Machida (JP); Mineo Nomoto, Yokohama (JP)

(73) Assignee: Hitachi, Ltd., Tokyo (JP)

(*) Notice: Subject to any disclaimer, the term of this patent is extended or adjusted under 35 U.S.C. 154(b) by 533 days.

(21) Appl. No.: 10/054,274

(22) Filed: Jan. 18, 2002

(65) Prior Publication Data

US 2003/0059105 A1 Mar. 27, 2003

(30) Foreign Application Priority Data

Sep. 25, 2001 (JP) ............................ 2001-292011

(51) Int. Cl.
*G06K 9/00* (2006.01)

(52) U.S. Cl. ....................... 382/145; 348/126; 700/110

(58) Field of Classification Search ................ 382/141, 382/144–150, 284, 294
See application file for complete search history.

(56) References Cited

U.S. PATENT DOCUMENTS

| | | | | |
|---|---|---|---|---|
| 5,856,871 | A * | 1/1999 | Cabib et al. | 356/503 |
| 6,016,562 | A * | 1/2000 | Miyazaki et al. | 714/724 |
| 6,684,379 | B2 * | 1/2004 | Skoll et al. | 716/11 |
| 2003/0002580 | A1 * | 1/2003 | Miura et al. | 375/240.02 |
| 2003/0006364 | A1 * | 1/2003 | Katzir et al. | 250/208.1 |

FOREIGN PATENT DOCUMENTS

| | | |
|---|---|---|
| JP | 3-138505 | 6/1991 |
| JP | 2000-009437 | 1/2000 |
| JP | 2000-285235 | 10/2000 |
| JP | 2000-294608 | 10/2000 |

* cited by examiner

*Primary Examiner*—Samir Ahmed
*Assistant Examiner*—Charles Kim
(74) *Attorney, Agent, or Firm*—Townsend and Townsend and Crew LLP

(57) ABSTRACT

A tool useful for defect analysis can be provided in which a surface image of the whole single die is detected, and the surface image of the whole detected die, information of defect position and a magnified image of a defect region are displayed together at a time so that the operator can intuitively grasp what circuit pattern the defect or the like is located on within a die.

19 Claims, 18 Drawing Sheets

METHOD AND APPARATUS FOR MANAGING SURFACE IMAGE OF THIN FILM DEVICE, AND METHOD AND APPARATUS FOR MANUFACTURING THIN FILM DEVICE USING THE SAME

BACKGROUND OF THE INVENTION

1. Field of the Invention

The present invention generally relates to the technologies associated with a method for detection and output of surface images of thin-film devices, and particularly to a technique for the detection/output of surface images of, for example, dies (chips) built up on wafers at each process of the production line of semiconductor devices or the like.

2. Description of the Related Art

For example, particle inspection apparatus and visual inspection apparatus used for particle inspection and visual inspection in the manufacturing process of semiconductor devices detect and produce the coordinates and sizes (in some cases, types) of particles (foreign objects) and defects. In this case, the size of the region over which those particles and defects are detected at a time is about (tens of microns~one-hundred and several-dozen microns, μm)×(tens of microns~one-hundred and several-dozen microns, μm), but the image of the region over which the detection is made in the inspection is generally not stored.

In addition, even the conventional observing apparatus such as the so-called review station is able to change the size of the region over which those defects can be detected up to the maximum area of about several hundred μm×several hundred μm, but generally it does not store the detected images.

When defects are observed by using the above inspection apparatus or observation apparatus, the observer can know where the observed defect is on the corresponding die by giving the coordinates of the defect, die size and layout information of the die on a wafer. Moreover, if an observation function such as the review station is incorporated in the inspection apparatus or observation apparatus, a local neighboring image including the detected defect can be detected.

Even though similar particles are detected, they do not act similarly to cause defects or not to cause defects, or they act differently depending on what circuit pattern they belong to within a die. Therefore, since circuit patterns for various purposes are formed within each die, even a nonfatal defect sometimes might be misdecided as fatal under only local observation. Accordingly, it is useful to know where the corresponding defect is located within a die and what circuit pattern it belongs to. However, since the region over which the conventional inspection apparatus can observe is about several hundred μm×several hundred μm at most, it is difficult to intuitively know where the defect is located within a die and what circuit pattern it belongs to.

Moreover, when we consider the case when the film thickness QC (Quality Control) is performed after the film deposition and flattening process, for example, after CMP (Chemical Mechanical Polishing) as one of the flattening process, it is known that the film thickness after the process varies differently depending on the proportion of local circuit patterns within a die (hereinafter, referred to as pattern area rate). In this case, in order to effectively evaluate the film thickness, it can be considered to measure, for example, the maximum and minimum film thickness portions. However, under the local observation that the conventional thickness meter can make, it is difficult to know which part has the maximum or minimum film thickness.

In addition, various technical knowledge is required to determine the exact cause by defect analysis from the results of particle inspection and visual inspection. In that case, it is useful to directly observe defects. However, since the conventional apparatus generally does not store the images, the corresponding defect image must be again detected by any method when it is required.

SUMMARY OF THE INVENTION

Accordingly, it is an object of the invention to make it possible to intuitively grasp where defects of particle or the like are located on a die and what circuit patterns the defects belong to, extract proposed regions of thickness measurement points on a die, generate an estimated thickness distribution, and utilize the detected images on each apparatus by sharing, thereby generally attaining a tool useful for QC and defect analysis.

In order to achieve the above object, according to one aspect of the invention, there is provided a method for managing images of thin-film devices including the steps of: picking up the surface image of the whole die on a wafer surface, displaying the obtained surface image of the whole die and information of, for example, defects or the like at a time so that the operator can intuitively grasp what circuit pattern the defects or the like belong to within the die. In addition, according to another aspect of the invention, there is provided a method of managing images of thin-film devices including the steps of: picking up the image of the whole die, extracting proposed regions of thickness measurement points on the die by, for example, image processing and displaying those regions so that the operator can simply grasp the proper position at which the film thickness is measured and a circuit pattern formed at that position. Moreover, according to another aspect of the invention, there is provided a method for managing images of thin-film devices in which the surface image is detected in color and the thickness distribution is estimated from the color irregularity due to the interference and displayed, thus helping the operator decide, for example, QC of film thickness. Also, according to still another aspect of the invention, there is provided a method of managing images of thin-film devices in which the picked up images are all or partially if necessary stored and utilized as data shared by each apparatus so that necessary images can be displayed at a desired time.

DESCRIPTION OF THE EMBODIMENTS

Embodiments of the invention will be described with reference to the accompanying drawings.

Figure 1:
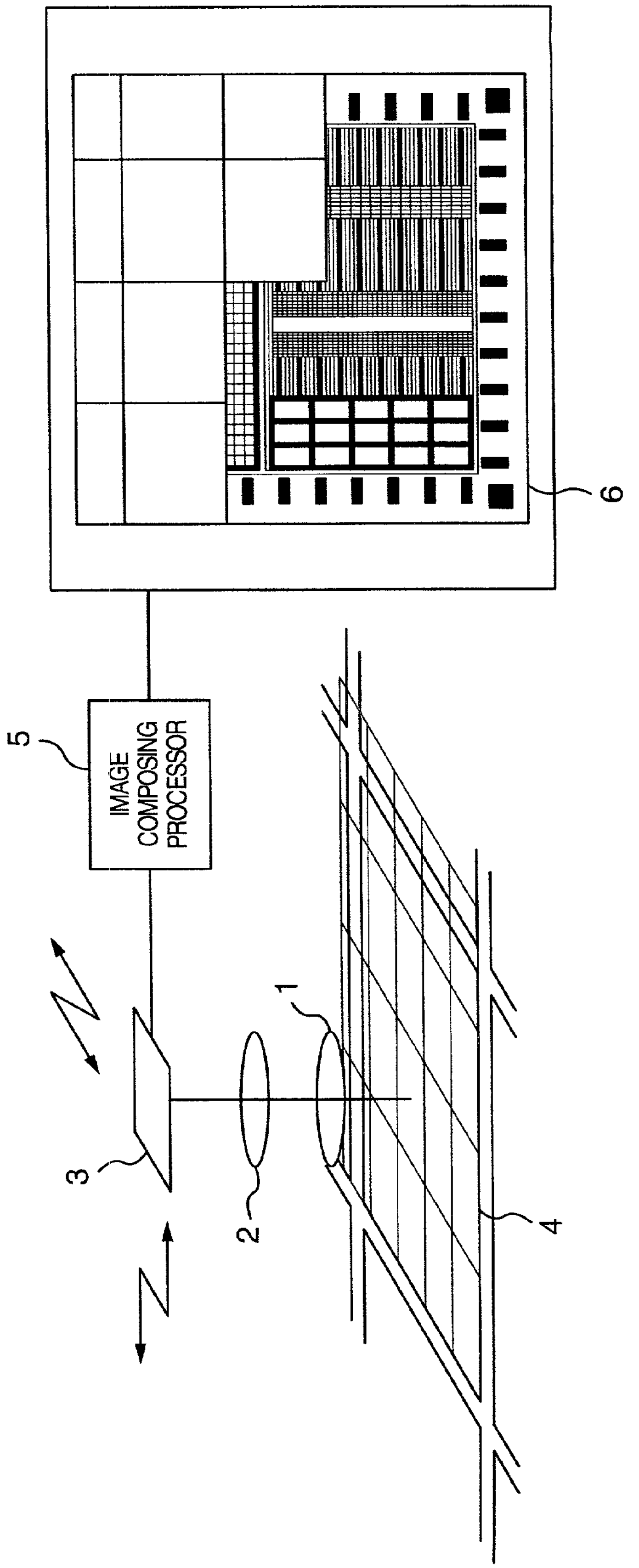
FIG. 1 is a diagram showing one example of the image pickup system of the invention to which reference is made in explaining a method of picking up die images.

A method of picking up the image of the whole die will be mentioned first. FIG. 1 shows the first example of the image pickup system according to the invention to which reference is made in explaining the method of picking up the die image. The image pickup system of this example includes an objective lens 1, a image lens 2 and a two-dimensional CCD sensor 3. This image pickup system picks up each of a plurality of small regions into which the whole region of a die (chip) 4 formed on a wafer is divided, and produces a partial image of each small region. Then, the partial images resulting from picking up the plurality of small regions are added by an image composing processor 5 to produce an all-die image (surface image) 6. The one-die image data thus produced, after properly compressed if necessary, is stored in appropriately large-capacity memory means such as a hard disk or optical disk not shown, together with management information (for example, production place name, merchandise category name, process name, wafer number, layout information of die on wafer, and special note information) added.

Figure 2:
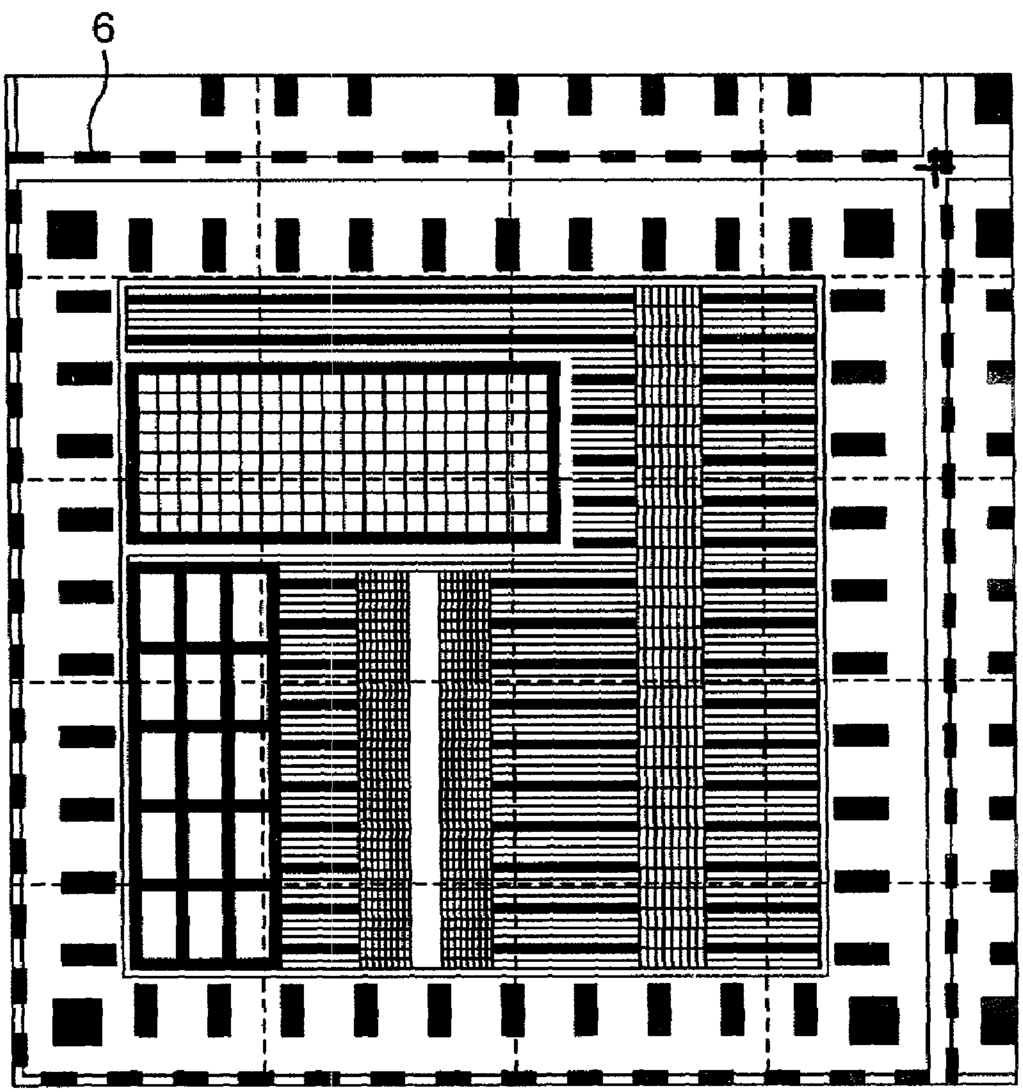
FIG. 2 is a diagram schematically showing an example of the one-die image composing method according to the invention.

FIG. 2 is a diagram schematically showing a method of producing one-die image. In FIG. 2, the portion surrounded by the bold dotted line is the image (one-die image) 6 of the whole die corresponding to the die 4. Each portion surrounded by the thin dotted line is the partial image corresponding to each small region that can be produced by single-time imaging operation. The procedure for obtaining the one-die image is as follows.

(1) First, set the relative positions of the image pickup system and the wafer in order to pick up each partial image for the detection of the whole die.

(2) Move the stage with the wafer placed or the image pickup system, and detect each partial image at the relative positions set at step (1).

(3) Locate the picked-up partial images in turn at proper positions with their boundaries aligned.

(4) Finally, cut the one-die region out.

Although the partial images are arranged not to overlap as described above, they can be partially overlapped in the neighborhood of their boundaries. In addition, there is the possibility that the partial images are discontinuous in brightness at the their boundaries because the picked-up individual regions (the small regions) have irregular illumination intensity when the images are added. In this case, the individual partial images are corrected for their brightness thereby to be continuous in brightness. The image processing for making the boundary's brightness continuous may be made after the images are added.

Figure 3:
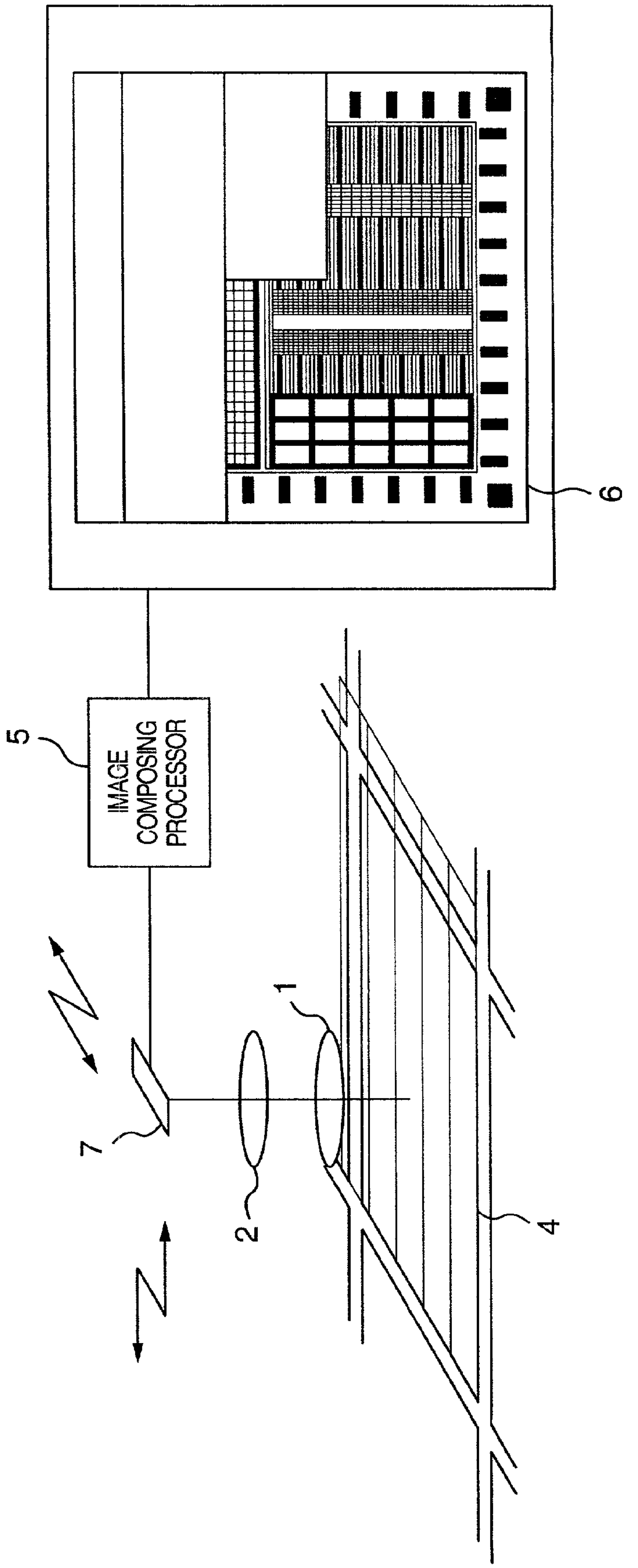
FIG. 3 is a diagram showing the second example of the image pickup system of the invention to which reference is made in explaining a method of picking up die images.

FIG. 3 shows the second example of the image pickup system of the invention to which reference is made in explaining the method of picking up the die image. The image pickup system of this example includes the objective lens 1, image lens 2 and a linear sensor 7 as a one-dimensional imaging device. This image pickup system scans the formed-on-wafer single die 4 a plurality of times for all regions to thereby pick up a plurality of individual partial images of the one-die region separately. The picked-up partial images are added by the image composing processor 5 to produce the one-die image 6 as the surface image of the whole die. In this example, the stage with the wafer placed is moved in the direction perpendicular to the longitudinal direction of the linear sensor 7 so that the sensor can detect each of the partial images during one scanning operation in synchronism with the movement of the stage.

The picking-up methods shown in FIGS. 1 and 3 can change the size of the region to be picked up at a time by adjusting the magnifying power of the optical system. It is thus desirable that the images be picked up with a necessary magnification if necessary.

Figure 4:
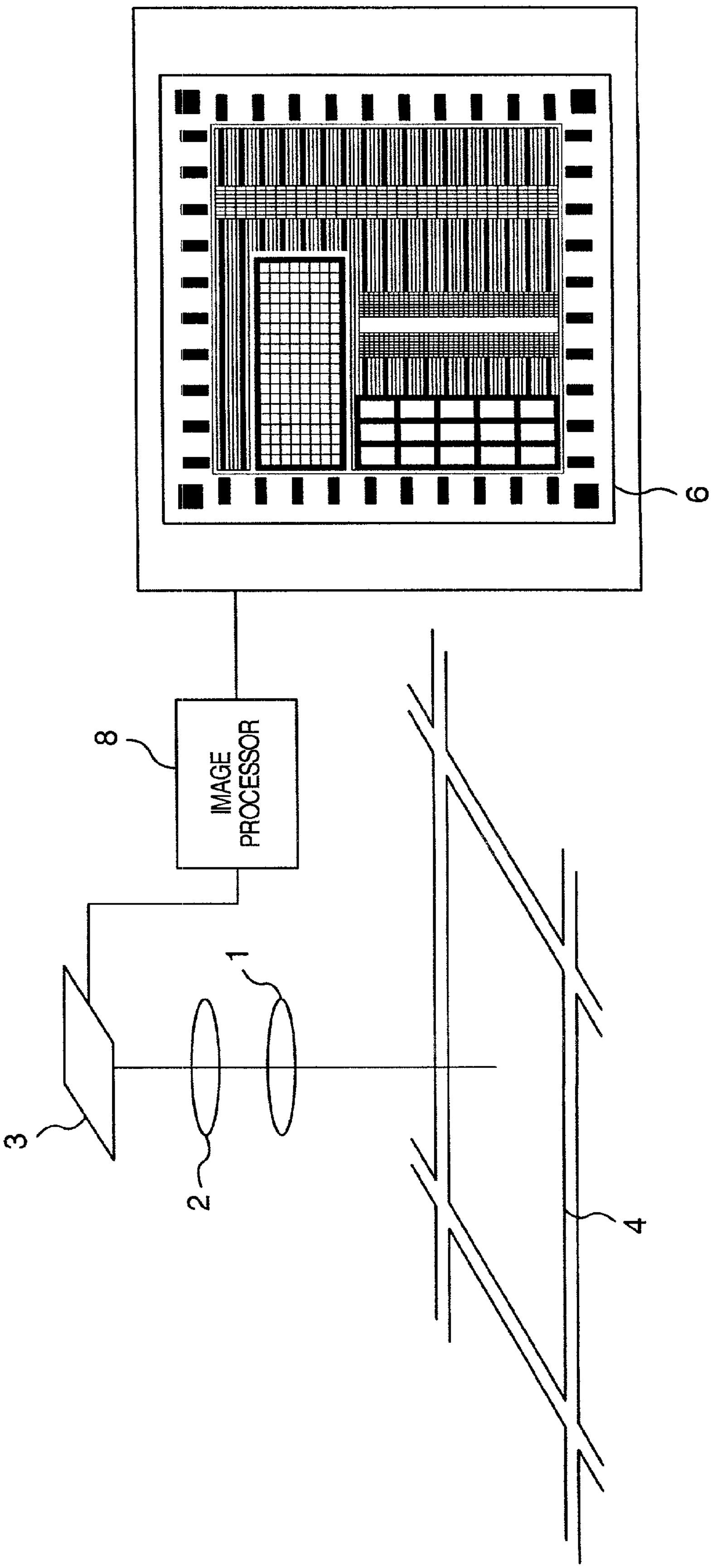
FIG. 4 is a diagram showing the third example of the image pickup system of the invention to which reference is made in explaining a method of picking up die images.

FIG. 4 is a diagram showing the third example of the image pickup system of the invention to which reference is made in explaining the method of picking up the die image. The image pickup system of this example includes the objective lens 1, image lens 2 and two-dimensional CCD sensor 3 like the image pickup system of FIG. 1. This example is different from the first example in that the one-die image is obtained at a time by adjusting the magnifying power in response to the size of the die to be picked up without adding the plurality of partial images. In this example, an image processor 8 is used to make image processing such as brightness correction and cutting-out of a one-die image. This example is suitable for the case where the resolution of the optical system is high and the CCD sensor used has a larger number of pixels than the current one as will be expected in the future.

Figure 5:
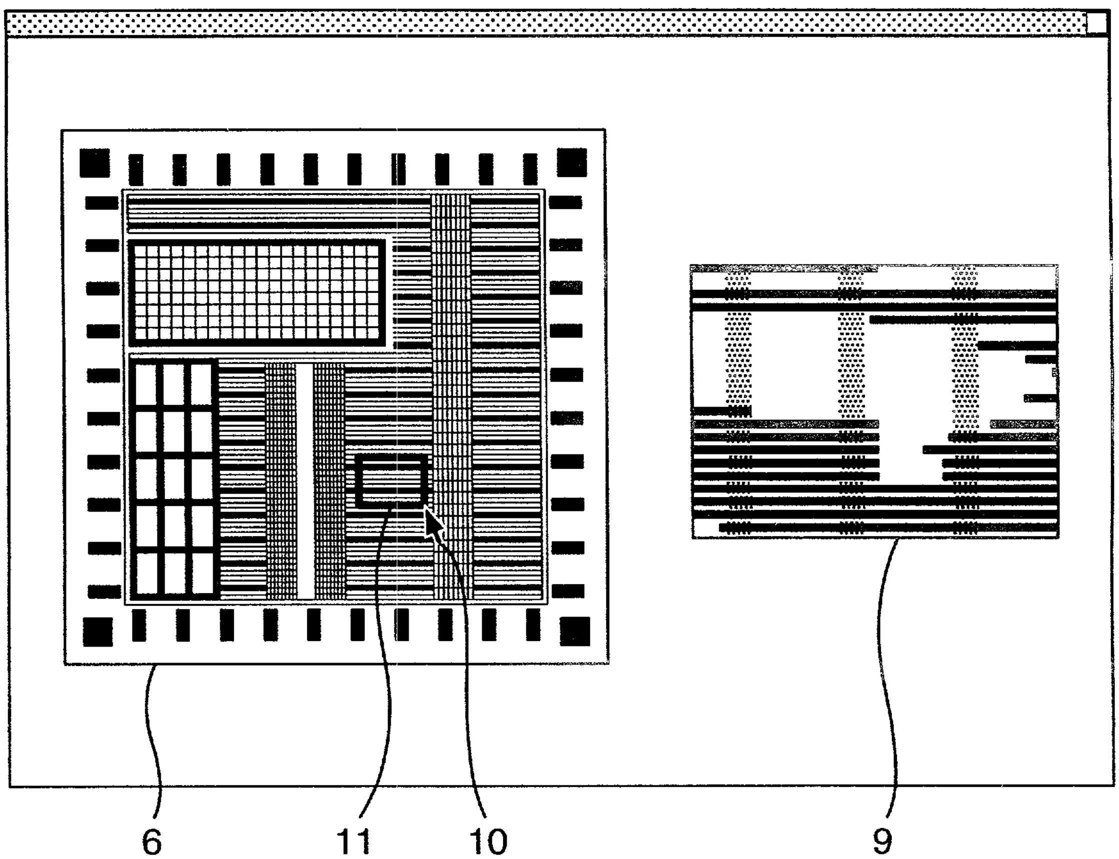
FIG. 5 is a diagram showing the first example of the display of images in a thin-film device surface image managing apparatus according to the invention.

FIG. 5 is a diagram showing the first example of the image display in the thin-film device surface image managing apparatus of the invention. This example is the simultaneous displaying of one-die image 6 and a magnified image (detailed image) 9 of part of the one-die image 6. In this example, a cursor 10 is used to specify a desired region within the one-die image 6, and a magnifying power is specified so that a specified region 11 to be magnified can be magnified and displayed as the magnified image 9 in the vicinity of the one-die image 6. According to the invention, the one-die image 6 and other images that are displayed or printed out together with the image 6 can be displayed in a magnified or reduced form at an arbitrary magnifying power/reduction ratio.

Since the resolution of the magnified image 9 depends on the optical system when the image is detected, the image detection is performed at a necessary resolution that the magnified image 9 needs. When the resolution of the image already detected is low, a specified region to be magnified is again detected at a high magnification so that a high-resolution image can be obtained. In addition, the magnified image 9 may be detected and displayed in real time. The important question is that the whole die image and a magnified image (detailed image) of part of the die image can be observed at a time. Thus, detailed information can be obtained from the magnified image 9 of a desired region of the one-die image 6, and where the region corresponding to the magnified image 9 is located on the die can be instantly and intuitively grasped.

Figure 6:
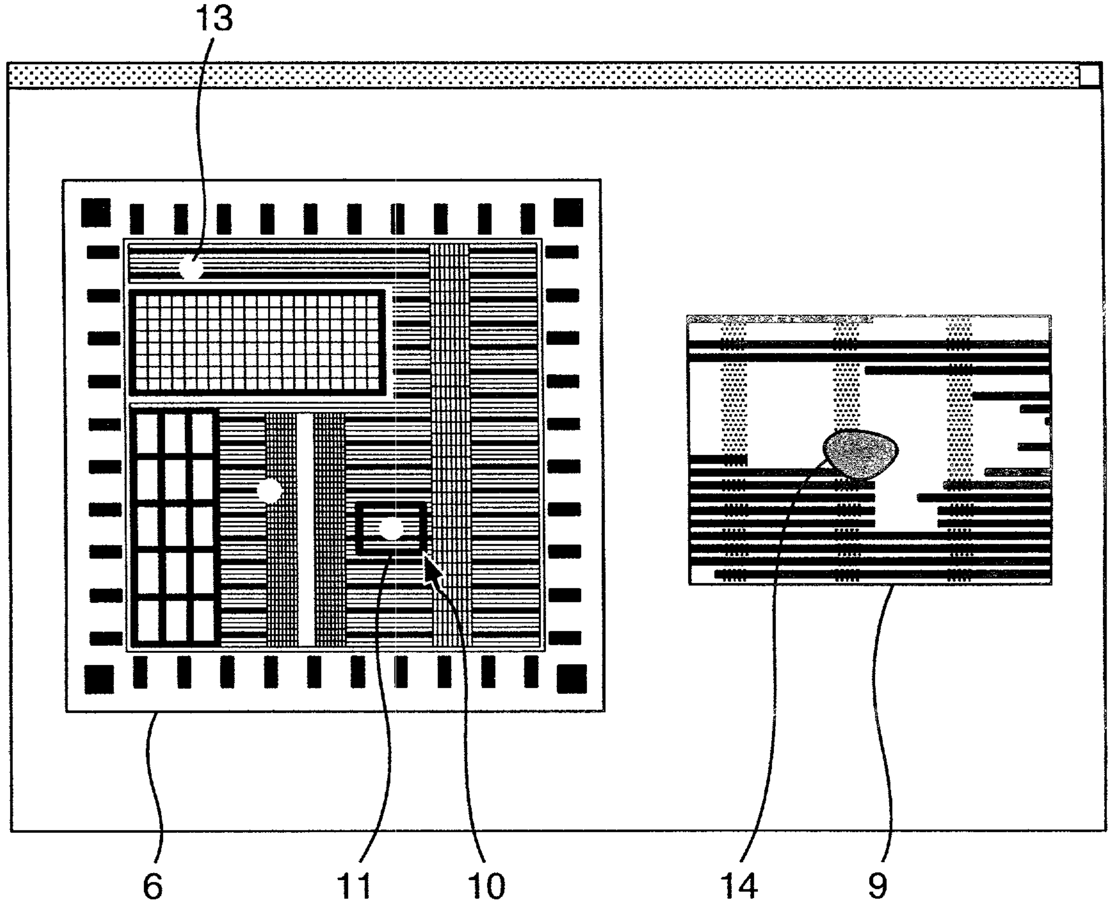
FIG. 6 is a diagram showing the second example of the display of images in the thin-film device surface image managing apparatus according to the invention.

FIG. 6 is a diagram showing the second example of the image displaying in the thin-film device surface image managing apparatus of the invention. In this example, the information of a particle (foreign object) detected by any separate means is also displayed in addition to the displaying of FIG. 5. The specified region 11 to be magnified is specified by the cursor 10 and the magnifying power is specified by a proper operation device in the same way as in FIG. 5, so that a desired region of the one die is magnified and displayed in a desired size. When a particle is found on the specified magnified region 11, the image of a separately obtained particle 14 is displayed with the same magnifying power to be overlapped on the magnified image 9. In this example, particle existence information 13 is indicated by a small circle within the one-die image 6. Thus, the user can confirm where the particle is located on the die at a glance, and by magnifying the region including the particle the user can easily check the shape of the particle, what circuit pattern the particle belongs to and what circuit patterns are formed in the vicinity of the particle.

Figure 7:
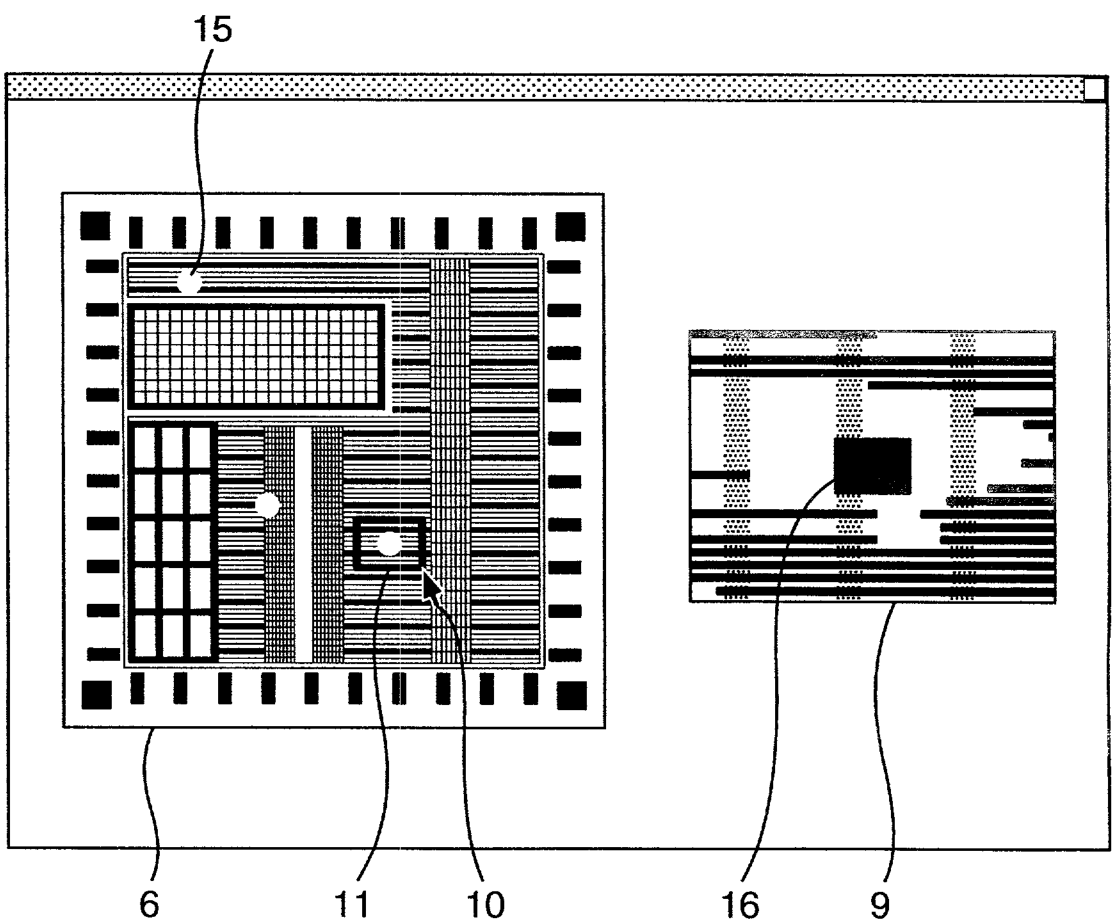
FIG. 7 is a diagram showing the third example of the display of images in the thin-film device surface image managing apparatus according to the invention.

FIG. 7 is a diagram showing the third example of the image displaying in the thin-film device surface image managing apparatus according to the invention. In this example, position information 15 of thickness measurement points appropriately set by separate means is displayed within the one-die image 6 as indicated by a small circle in addition to the displaying showing in FIG. 5. Like the case shown in FIGS. 5 and 6, the region of the thickness measurement point within the one-die image 6 is specified as the region 11 by the cursor 10, and a desired magnifying power is specified by a proper operation device, so that it can be displayed in a desired size as the magnified image 9. Thus, the measurement point on the die can be confirmed at a glance, and the region in which the measurement point is included is magnified and displayed, thereby enabling the user to easily check what circuit pattern 16 the thickness measurement point belongs to and what circuit patterns are formed in the vicinity of the measurement point.

Figure 8:
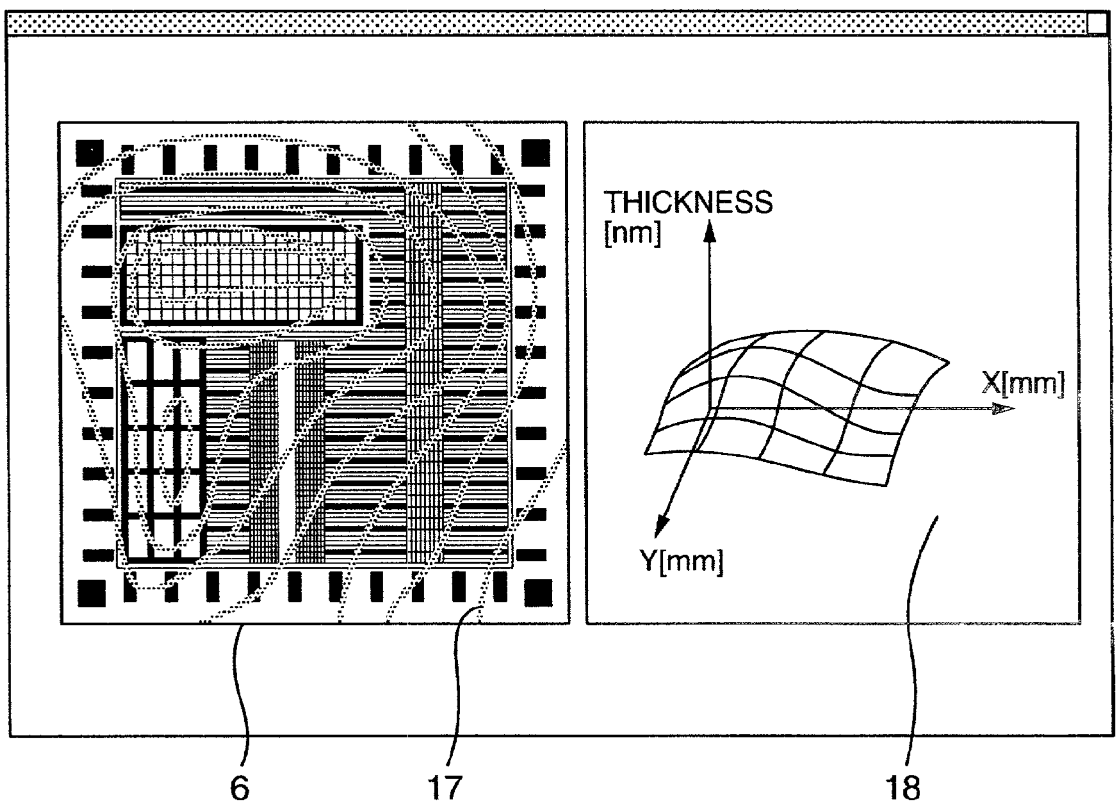
FIG. 8 is a diagram showing the fourth example of the display of images in the thin-film device surface image managing apparatus according to the invention.

FIG. 8 is a diagram showing the fourth example of the image displaying in the thin-film device surface image managing apparatus of the invention. In this example, the one-die image 6 and information of a film thickness detected by any separate means are displayed at a time. In this example, level curves 17 of thickness distribution are displayed to overlap on the one-die image 6, and a three-dimensional graph 18 of thickness distribution of one die is displayed in the neighborhood of the one-die image. The one-die image can be displayed to add to the thickness distribution graph by image processing, though not shown. This enables the user to understand the thickness distribution more easily. Thus, the die thickness distribution can be grasped with good visibility and with accuracy.

Here, much information can be extracted from the images thus detected by applying various image processing operations to the images. As one example of this case, a description will be made of the image processing by which the information useful to determine the thickness measurement point can be obtained.

Figure 9:
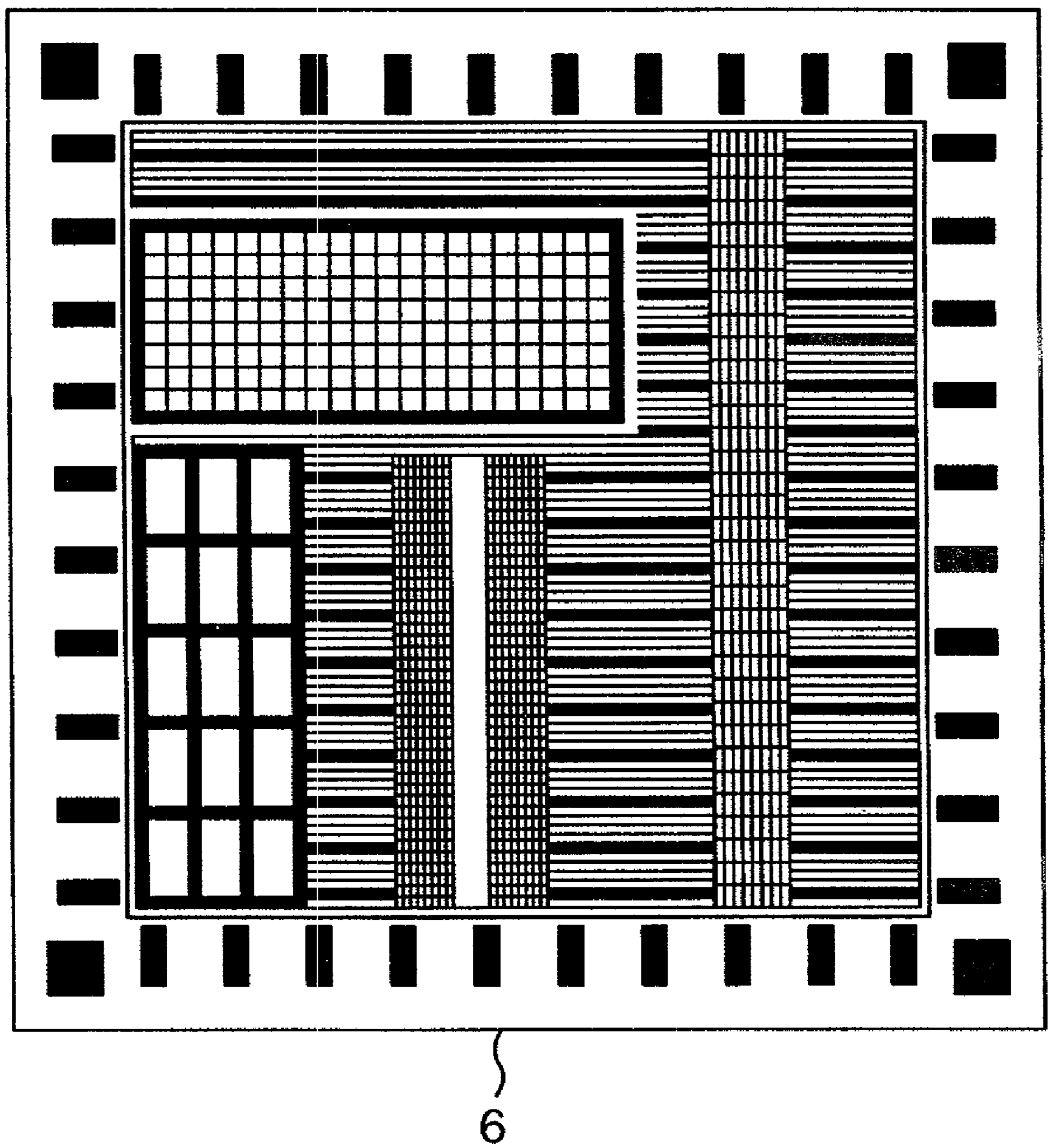
FIG. 9 is a diagram showing an example of a one-die image detected by the thin-film device surface image managing apparatus.
Figure 10:
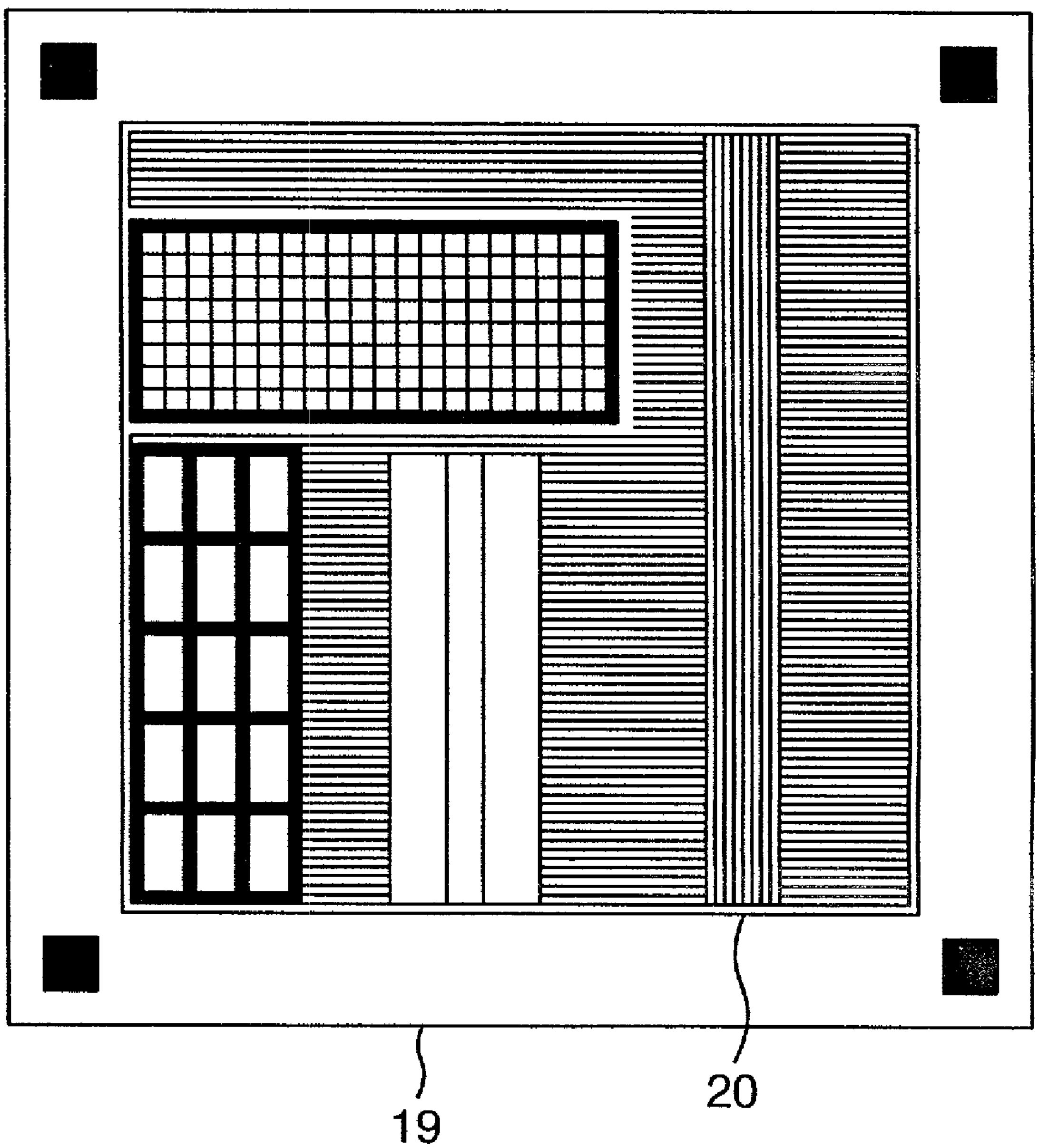
FIG. 10 is a diagram showing the top-layer pattern extracted image associated with the one-die image of FIG. 9.

To measure a film formed of multiple layers, the same detection region is defocused for each layer so that a plurality of images can be detected, thus making it possible to extract desired patterns of layers. FIG. 9 shows an example of the one-die image 6 of a multilayer structure detected by the thin-film device surface image managing apparatus according to the invention. FIG. 10 schematically shows an image (top-layer pattern extracted image 19) of only an extracted top-layer pattern 20 of the multilayer structure to be detected. This top-layer pattern extracted image 19 can also be obtained by a proper extraction process using the one-die image of multilayer structure and design information (design pattern position/shape information) previously given.

Figure 11:
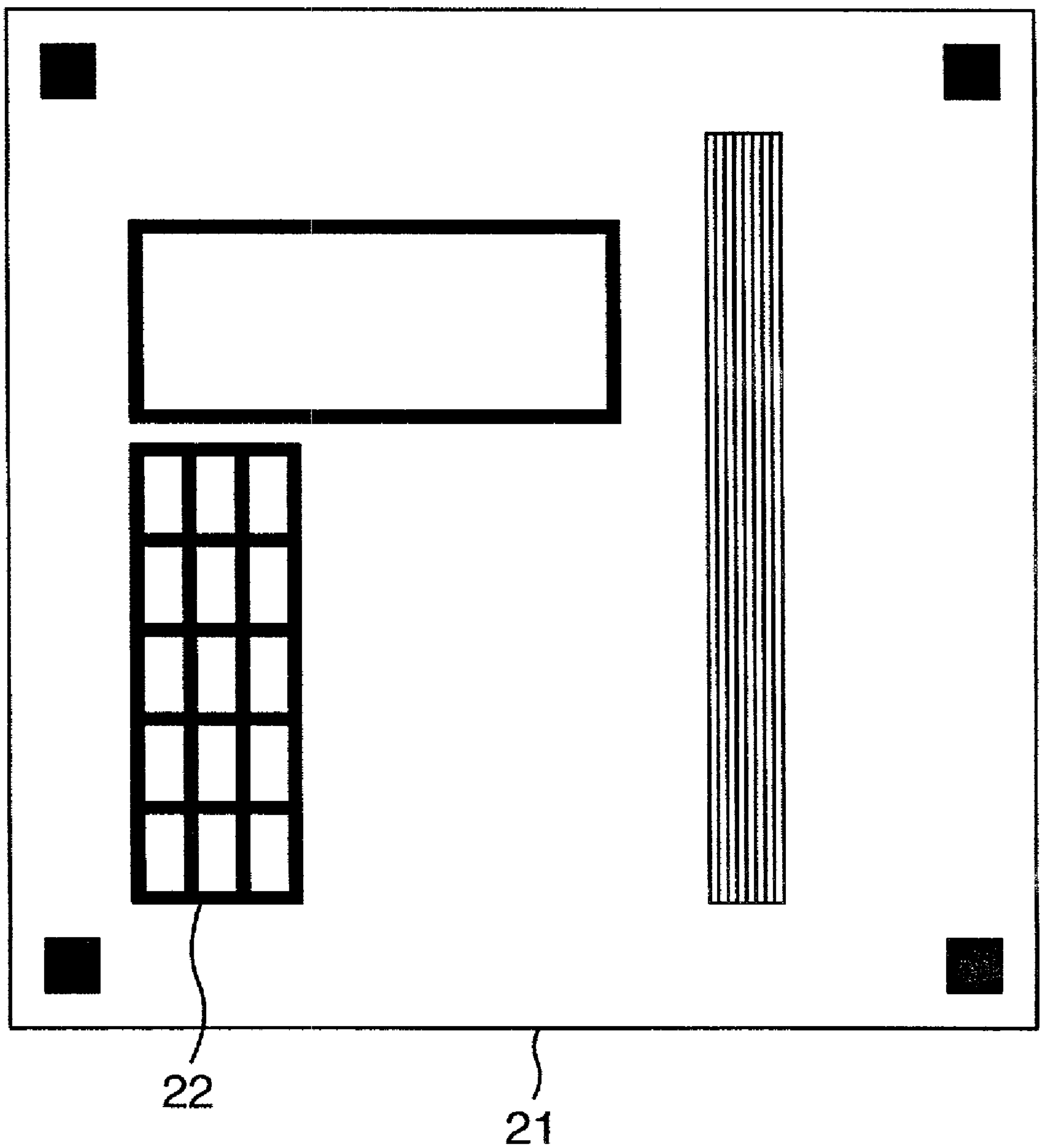
FIG. 11 is a diagram showing a specified line-width or more pattern image extracted from the top-layer pattern extracted image of FIG. 10.

The top-layer pattern extracted image 19 of FIG. 10 is processed so that a pattern 22 of more than a specified line width can be extracted as a more-than-specified line width pattern extraction image 21 as shown in FIG. 11. The conventional thickness meter needs a flat region of about several dozen $\mu$m×several dozen $\mu$m as a region to be measured. Thus, if a line width that can assure the above necessary flat region is specified when the pattern 22 of more than a specified line width is extracted as in FIG. 11, it is possible to automatically extract the region that can be measured by the conventional general thickness meter. Therefore, since an appropriate region to be proposed as a thickness measurement point can be presented by narrowing down, this image is very useful for determining the measurement point of thickness QC.

Figure 12:
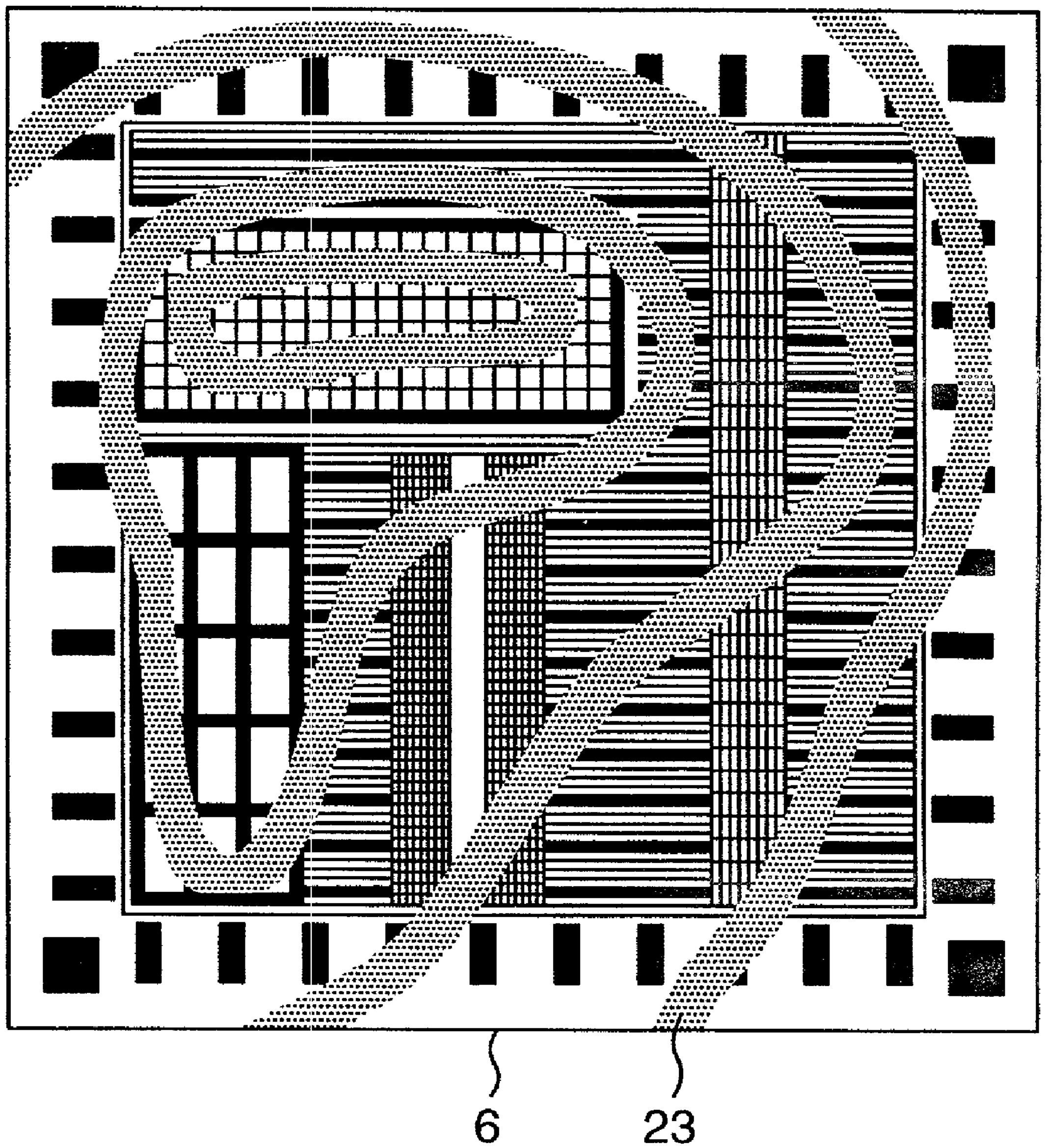
FIG. 12 is a diagram showing an overlap image of the one-die image and an interference irregularity (color irregularity) detected by the thin-film device surface image managing apparatus according to the invention.

If the images are detected in color, it is possible to check the color irregularity due to the intra-film interference within the die. FIG. 12 shows a displayed overlap of the one-die image 6 of multilayer structure and interference irregularity (color irregularity) 23 detected by the thin-film device surface image managing apparatus according to the invention. If the top-layer pattern extracted image 19 as shown in FIG. 10 is detected in color, it is possible to check the interference color irregularity of only the top layer.

Figure 13:
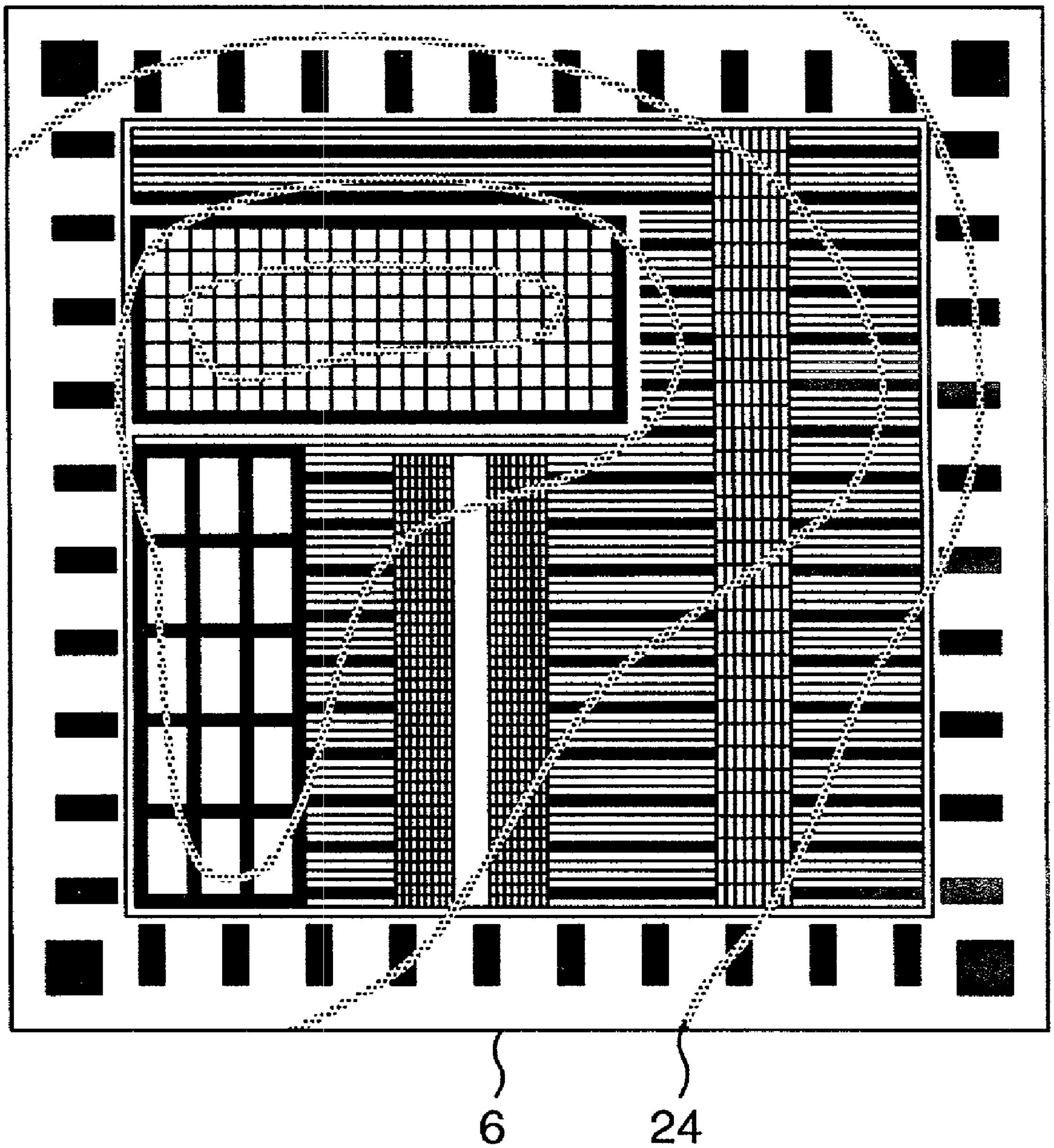
FIG. 13 is a diagram showing an overlap image of the one-die image and an estimated film-thickness distribution extrapolated from the interference irregularity of FIG. 12.

Moreover, since the interference color is determined by the film thickness, the thickness distribution within the die can be estimated from the extracted interference irregularity. FIG. 13 shows a displayed overlap of an estimated thickness distribution (level curves) 24 derived from the interference irregularity 23 shown in FIG. 12 and the one-die image 6. Thus, the film thickness distribution can be roughly known from the estimated thickness distribution presumed from the interference irregularity.

The information of estimated thickness distribution 24 shown in FIG. 13 and the proposed region information as a thickness measurement point shown in FIG. 11 are used, and for example an algorithm for selecting one or several measurement points from the large, medium and small regions of the proposed measurement point regions is employed, thereby making it possible to automatically decide the thickness measurement points for thickness QC. Thus, since appropriate measurement points can be automatically decided, the thickness QC can receive benefits tremendously.

The JP-A-2000-9437 gazette discloses a technique capable of measuring even the region that is so uneven within the measurement field of view as not to be measured by the conventional measuring device. In the above image processing according to the invention, if "extraction of a region of more than a specified pattern area rate within a specified-size region" is selected instead of "extraction of a pattern of more than a specified line width), it is possible to automatically extract the region that can be measured by the thickness measurement technique described in JP-A-2000-9437. Thus, similarly, when the measurement technique according to JP-A-2000-9437 is employed, the thickness measurement points can be automatically set.

Incidentally, as described previously, images of defects detected by an inspection apparatus were usually discarded without being stored unless they were printed out by hardware. On the contrary, according to the invention, the above-mentioned detected images, and the above positional information of particles, images of particle, positional information of thickness measurement points and information of film thickness distribution incidental to that images are stored in proper large-capacity memory means additionally provided in the surface image managing apparatus of the invention or another appropriate large-capacity memory means provided common to a plurality of surface image managing apparatus of the invention with the above management information added, and are managed without being discarded. The images stored in the memory means are read, if necessary, by the surface image managing apparatus of the invention or other different inspection or manufacturing apparatus or computer system (personal computer and host computer) connected through a network to this managing apparatus. The read images, when they are compressed, are expanded, and then undergo proper image processing or appropriate editing process, if necessary so that they can be displayed in a form the operator desires or printed out in a form the operator likes. The above network may be an appropriate network such as LAN, leased line network or wide area network like Internet. The apparatus connected through a network may be any combination of apparatus such as a combination of apparatus of the same production line, a combination of apparatus provided in the same production site, a combination of apparatus provided in different production sites or a combination of production line apparatus and apparatus provided in research/development/design sites so that any piece of image data can be utilized as a common source.

The images stored in the memory means can be searched for under an arbitrary search condition, and the data searched under an arbitrary search condition can be displayed or printed out in a predetermined format or an arbitrary format the operator edited.

Figure 14:
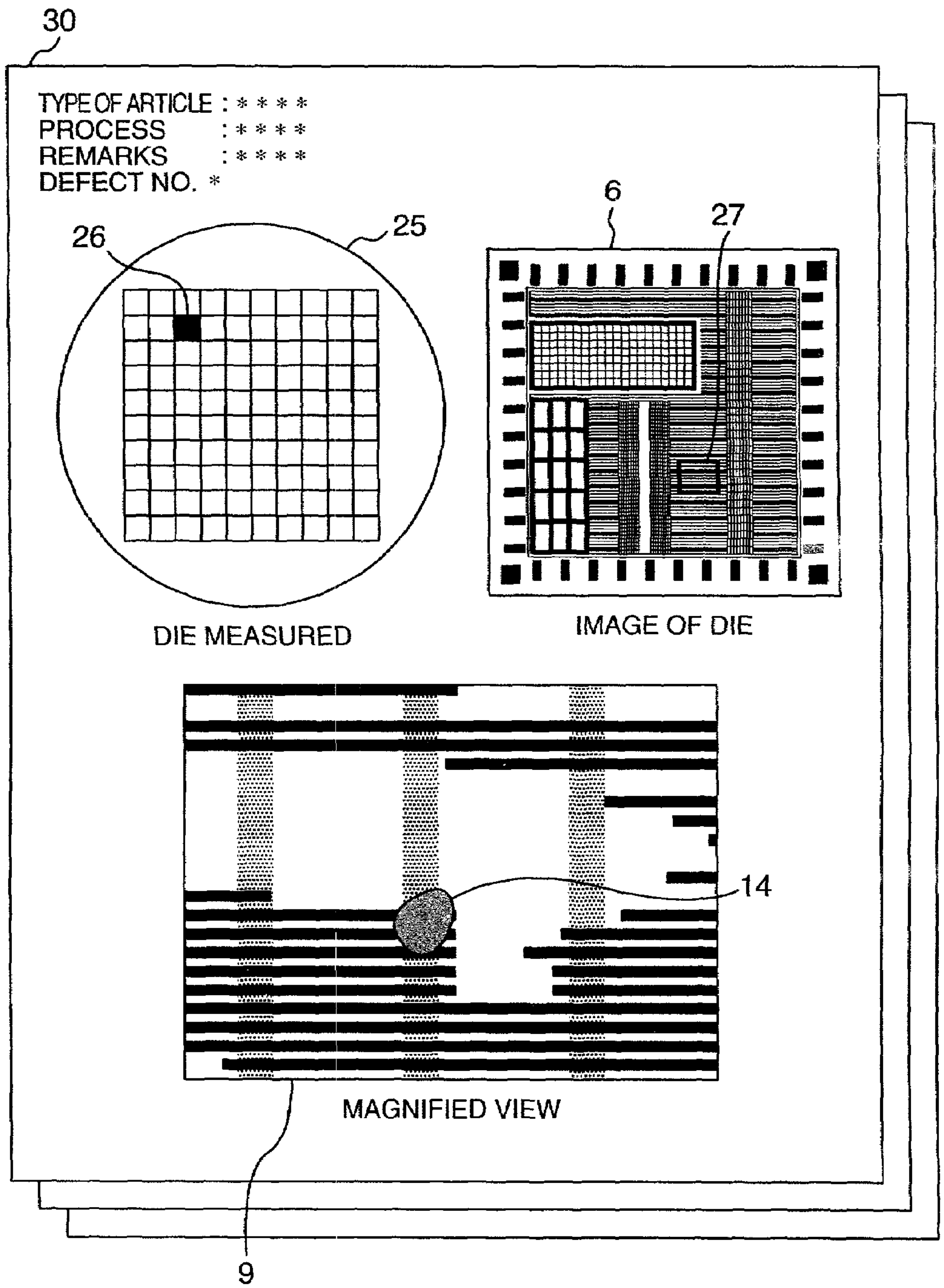
FIG. 14 is a diagram showing the first example of the printed output produced in a report form according to the invention.

FIG. 14 is a diagram showing the first example of the printed output produced in a report form by a page printer and the surface image detection/output apparatus of the invention or the apparatus connected through a network to that apparatus of the invention. This example is an application of defected images to management report. As illustrated in FIG. 14, a die layout 25 for the indication of a die 26 to be inspected on a wafer, the one-die image 6 to be examined on which a particle position 27 is overlapped, and an overlap image of the image of particle 14 and the magnified image 9 extracted from the vicinity of the particle are printed out together with a text of manufactured article information 30.

In this example, if "particle on memory cell patterns" is specified to the stored image data, all relevant data corresponding to that condition can be printed out together with manufactured article information in a report form of a plurality of pages. The classification of images, though not particularly mentioned, is made by using any method. If the output of such a report form is produced in an arbitrary timing by any apparatus, the defect management report including a large number of image data can be acquired in good timing from a necessary place by operators who desire such information, so that the report can be utilized for the analysis of defect tendency, clarification of defect factor and countermeasure against failure.

Figure 15:
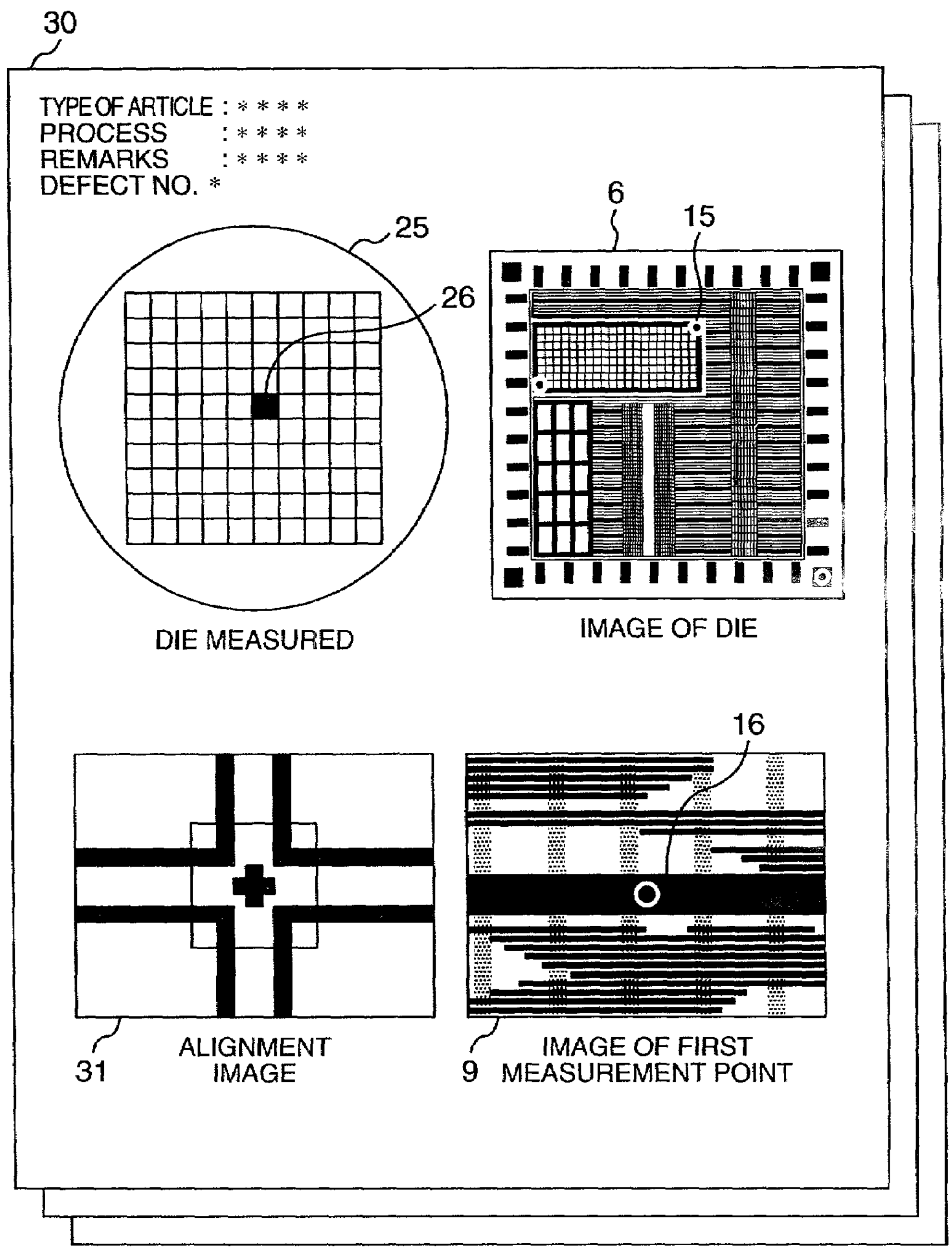
FIG. 15 is a diagram showing the second example of the printed output produced in a report form according to the invention.

FIG. 15 is a diagram showing the second example of the printed output produced in a report form by a page printer and the surface image managing apparatus of the invention or apparatus connected through a network to the apparatus of the invention. This example is an application of the thickness measurement position to management report. As illustrated in FIG. 15, the die layout 25 for the indication of the die 26 to be inspected on a wafer, the one-die image 6 to be examined on which the thickness measurement point 15 is overlapped, an overlap image of the thickness measurement pattern (circuit pattern) 16 and the magnified image 9 extracted from the vicinity of the pattern and a magnified image 31 of the alignment mark (here, cross mark) on a wafer are printed out together with a text of manufactured article information 30. Since the management report of this example includes all information of thickness measurement points and has a form in which that information can be grasped intuitively, it is very useful for the comparison among the film thickness QC of different manufacturing sites.

Figure 16:
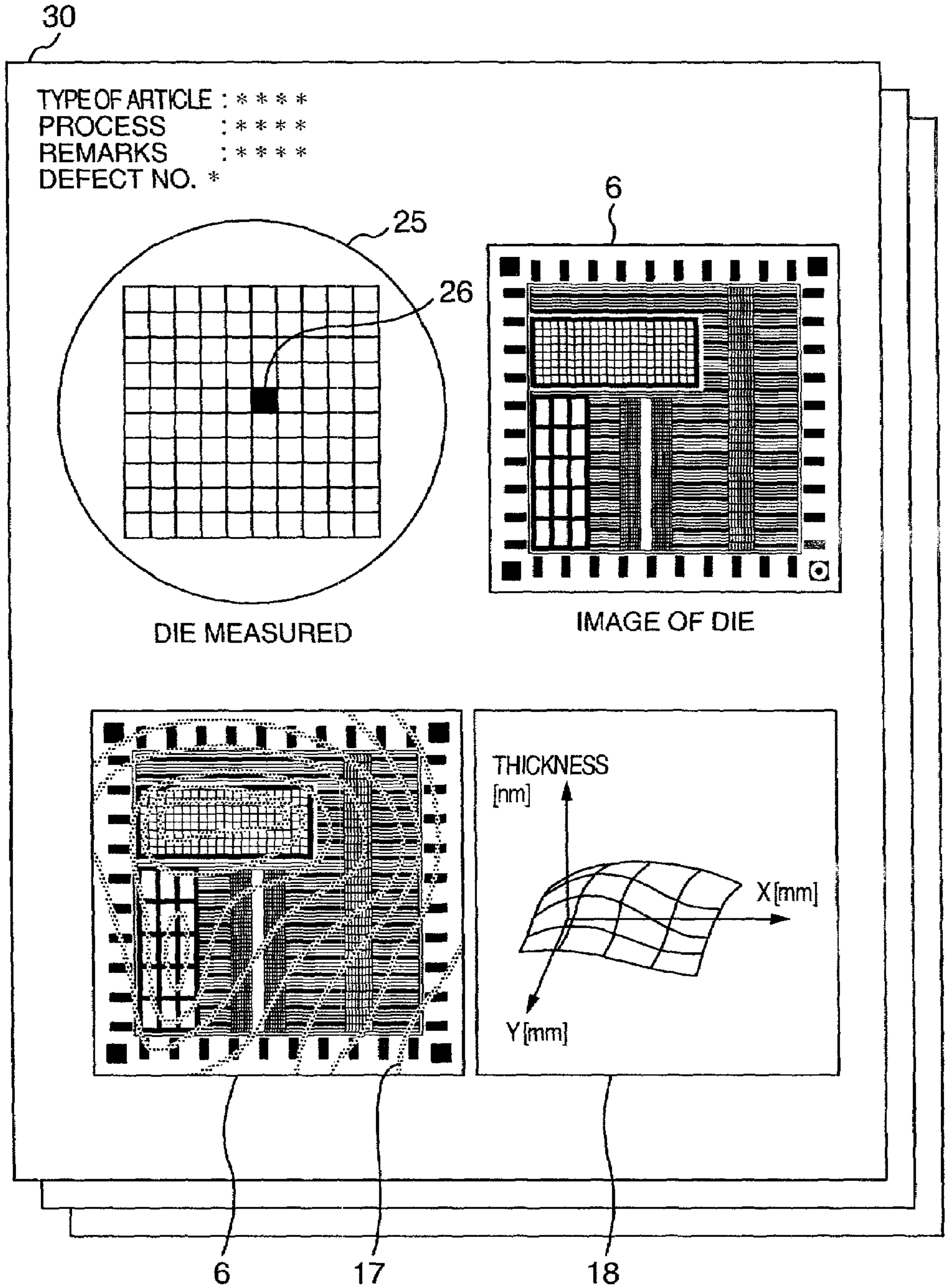
FIG. 16 is a diagram showing the third example of the printed output produced in a report form according to the invention.

FIG. 16 is a diagram showing the third example of the printed output produced in a report form by a page printer and the surface image management apparatus of the invention or apparatus connected through a network to the apparatus of the invention. This example is an application of the thickness distribution to management report. As illustrated in FIG. 16, the die layout 25 for the indication of the die 26 to be inspected on a wafer, the one-die image 6 to be examined, an overlap image of the thickness distribution level lines 17 and the one-die image 6 to be inspected, and the three-dimensional graph 18 of the thickness distribution of the die to be inspected are printed out together with a text of manufactured article information 30. Since the management report of this example includes thickness distribution that can be intuitively grasped at a glance, it is greatly helpful for inspection and management of thickness distribution.

Figure 17:
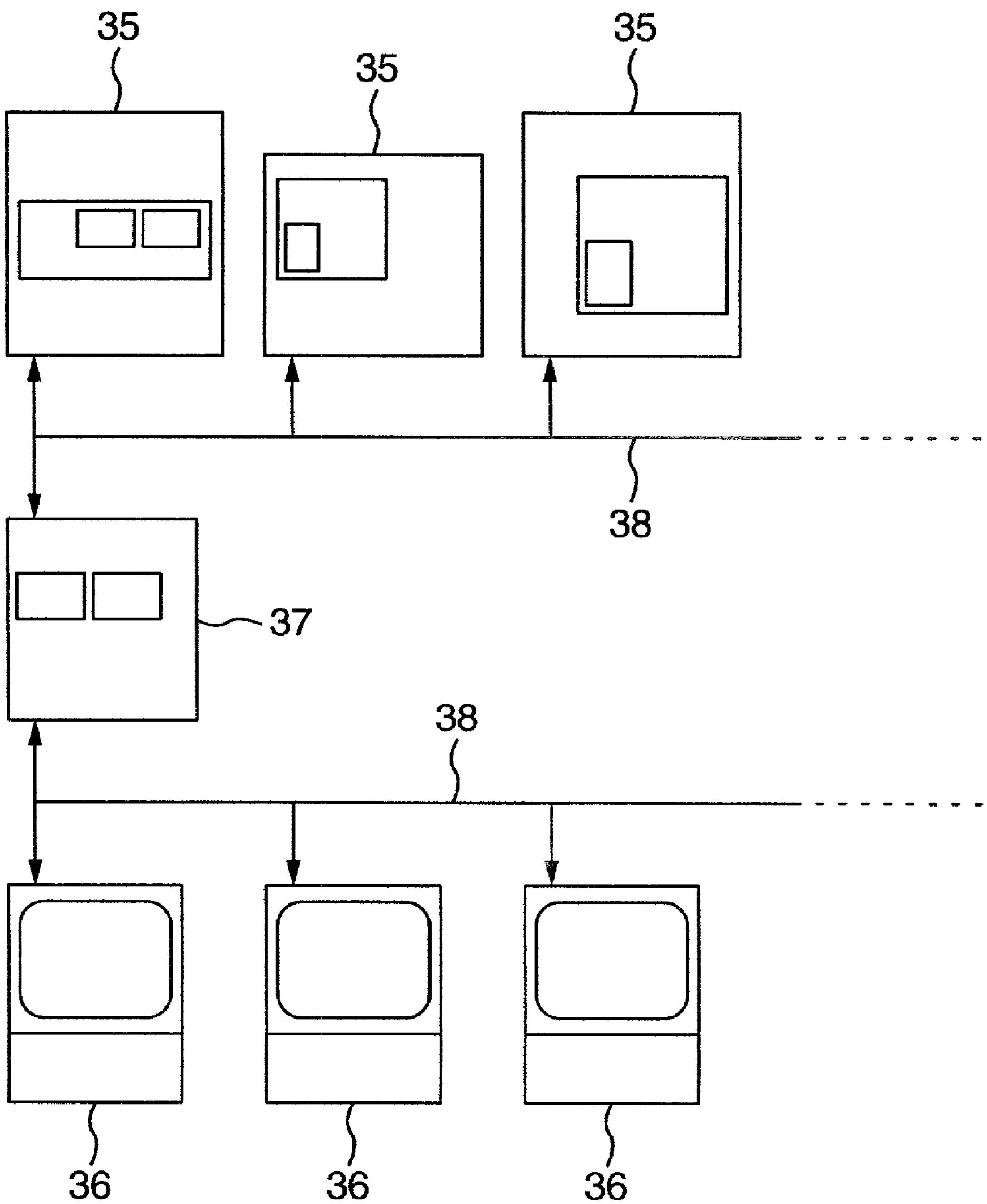
FIG. 17 is a diagram showing the connection of the thin-film device surface image managing apparatus according to the invention, and various different examination or manufacturing apparatus.

FIG. 17 shows an example of the connection of a surface image managing apparatus 37 of the invention, a plurality of different inspection or manufacturing apparatus 35, and a plurality of personal computers 36 through a network 38. Here, the surface image managing apparatus 37 and a plurality of different examination or manufacturing apparatus 35 are provided in the same production line. The detected images and the associated information stored in the above large-capacity memory means are utilized for management of defective/nondefective items, understanding of defect tendency and analysis of defects by both the apparatus 37 and 35, so that the manufacturing system can be constructed to produce thin-film devices as effective production management is performed. The data stored in the large-capacity memory means can be not only utilized by the apparatus 37 and 35, but also searched freely and read out by the personal computers 36 connected to the network 38. Thus, if the read data can be properly processed, the personal computers 36 can be effectively used as defect analysis tools.

Figure 18:
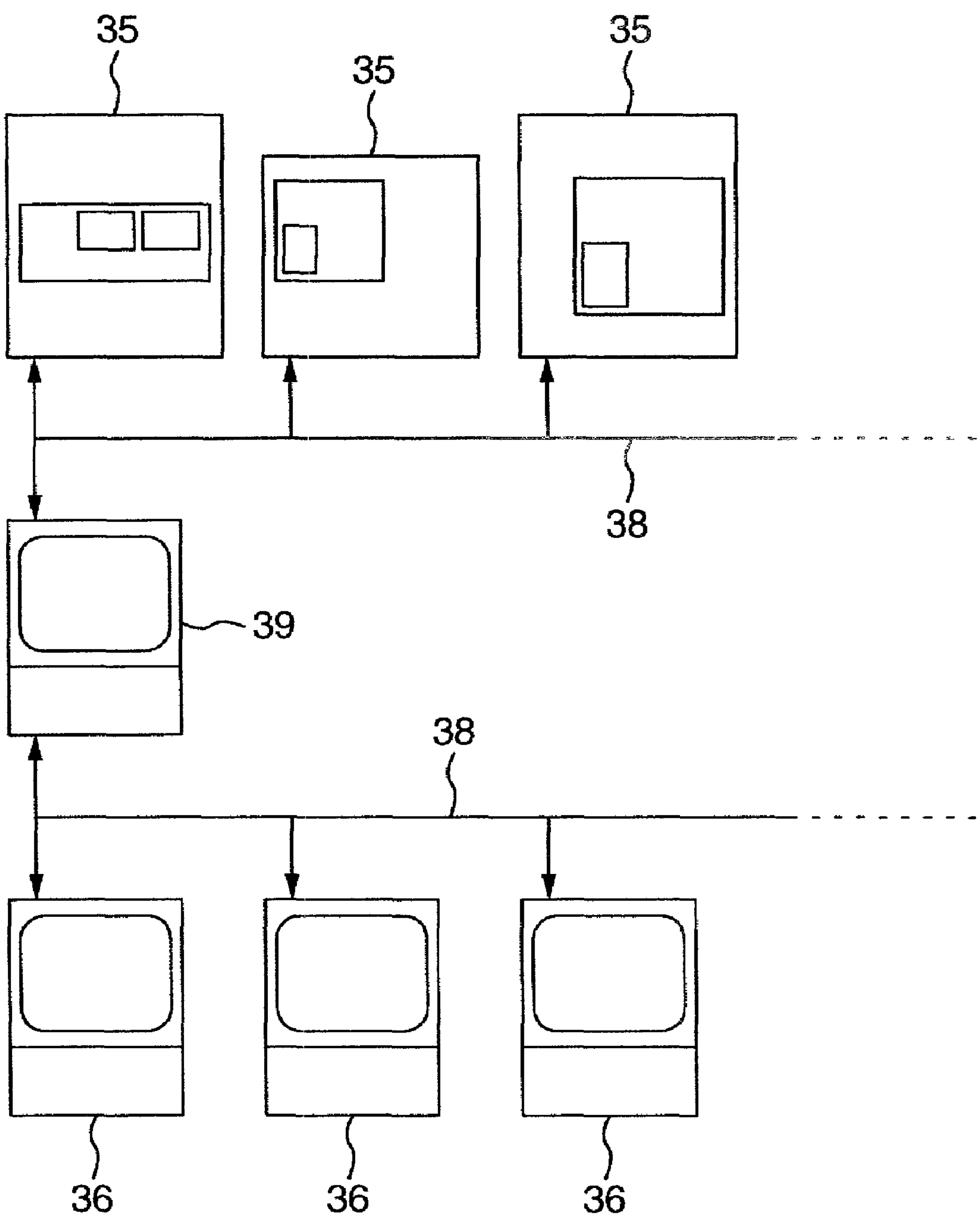
FIG. 18 is a diagram showing the connection of computers and various examination or manufacturing apparatus having incorporated therein the functions of the thin-film device surface image managing apparatus according to the invention.

In addition, the surface image managing apparatus of the invention does not need a special optical system. Therefore, the functions of the surface image management apparatus of the invention may be incorporated in each different inspection or manufacturing apparatus 35 itself so that the detected images can be utilized mutually by those apparatus 35. FIG. 18 shows an example of the connection of a plurality of different inspection or manufacturing apparatus 35 in which the functions of the surface image managing apparatus of the invention are incorporated, a host computer 39, and a plurality of personal computers 36 through a network 38.

Thus, according to the invention, where defects of foreign matter are located on a die and what circuit patterns they belong to can be grasped intuitively, and it is possible to extract the proposed regions of thickness measurement points on a die and generate an estimated thickness distribution. Moreover, since the detected images can be utilized by those apparatus, it is possible to acquire a tool useful for QC and defect analysis.

It will be further understood by those skilled in the art that the foregoing description has been made on embodiments of the invention and that various changes and modifications may be made in the invention without departing from the spirit of the invention and scope of the appended claims.

What is claimed is:

1. A method of managing surface images of thin-film devices comprising the steps of:

picking up at least one die region on a wafer surface by image pickup means to produce the whole image of said region;

storing data of said whole image in memory means so that said data can be output from said memory means;

inputting information of said region, said information being obtained by an inspection means or by a measuring means; and displaying on a display screen said whole image of said region and said inputted information of said region, including adjusting a magnification of said whole image to produce an adjusted whole image and overlaying said adjusted whole image with said inputted information of said region; and wherein said information of said region comprises film thickness information obtained by a film thickness measuring means.

2. A method according to claim 1, wherein said image pickup means is a two-dimensional imaging device, and said step of picking up includes picking up at least the whole one-die region at a time by said two-dimensional imaging device.

3. A method according to claim 1, wherein said image pickup means is a two-dimensional imaging device, and said step of picking up includes picking up a plurality of portions of said one die region separately by said two-dimensional imaging device, and composing the resulting partial images to produce said whole image.

4. A method according to claim 1, wherein said image pickup means is a one-dimensional imaging device, and said step of picking up includes picking up a plurality of portions of said one die region separately by said one-dimensional imaging device, and composing the resulting partial images to produce said whole image.

5. A method according to claim 1, further comprising the steps of:

picking up a desired portion of said one die region to produce a detailed image of said desired portion; and displaying said detailed image and said whole image together by display means so that these images can be observed at a time.

6. A method according to claim 5, wherein said detailed image and said whole image are magnified or reduced at a desired magnifying power so that they can be displayed in a magnified or reduced form.

7. A method according to claim 5, wherein said whole image or said detailed image is subjected to image processing so that the image obtained by said processing can by output.

8. A method according to claim 7, wherein said image processing extracts a proposed region of film thickness measurement point.

9. A method according to claim 7, wherein said image processing detects a film thickness distribution.

10. A method according to claim 1, wherein said information of said region is particle information obtained by a particle inspection means.

11. A method according to claim 1, wherein desired information is extracted by comparing said whole image and design information.

12. A method according to claim 1, wherein said whole image stored in said memory means is searched for under a plurality of search conditions, and the result of said searching can be output.

13. A managing apparatus for surface image of thin-film device comprising:

image pickup means for picking up at least one die region on a wafer surface; and memory means for storing data of a whole image of said region picked up by said image pickup means;

examination means for producing examination information for at least a portion of said region, said examination information comprising inspection information or measurement information;

display means for displaying an image comprising said whole image overlaid with said examination information; and wherein said examination information comprises film thickness information obtained by an examination means comprising a film thickness measuring means.

14. A managing apparatus according to claim 13, wherein said display means further includes adjusting a magnification of said whole image.

15. A managing apparatus according to claim 14, further comprising:

image pickup means for picking up a desired portion of said one die region to produced a detailed image of said portion, wherein said display means displays said detailed image and said whole image together.

16. A management system for surface image of thin-film device comprising:

image pickup means for picking up at least one die region on a wafer surface;

examination means for producing examination information for at least a portion of said region, said examination information comprising inspection information or measurement information;

memory means for storing data of a whole image of said region picked up by said image pickup means; and a plurality of display means for displaying said whole image stored in said memory means, these display means being connected to said memory means through lines of communication, at least one of said display means operative to display said whole image overlaid with said examination information; and wherein said examination information comprises film thickness information obtained by an examination means comprising a film thickness measuring means.

17. A method of manufacturing thin-film devices comprising steps of:

picking up at least one die region on a wafer surface by image pickup means to produce a whole image of said region;

storing data of said whole image in memory means so that said data can be output from said memory means;

obtaining inspection information for said one die region from an inspection apparatus or from a measurement apparatus;

picking up a desired portion of said one die region to produce a detailed image of said portion, said detailed image and said whole image being used to decide if the dies formed on said wafer are nondefective or defective; and displaying a magnified portion of said whole image overlaid with said inspection information; and wherein said inspection information comprises film thickness information obtained by a film thickness measuring means.

18. A manufacturing method according to claim 17, wherein defect tendency is extracted on the basis of said whole image.

19. An apparatus for producing thin-film devices comprising:

image pickup means for picking up at least one die region on a wafer surface to produce a whole image of said region;

memory means for storing data of said whole image;

test apparatus for producing inspection information or measurement information for said die region;

image pickup means for picking up a desired portion of said one die region to produce a detailed image of said portion, said detailed image and said whole image being used to device if the dies formed on said wafer surface are nondefective or defective; and display means for displaying a magnified portion of said whole image overlaid with said inspection information or measurement information; and wherein said inspection information or measurement information comprises film thickness information obtained by a test apparatus comprising a film thickness measuring means.

* * * * *